US012674517B2

(12) United States Patent
Watanabe et al.

(10) Patent No.: US 12,674,517 B2
(45) Date of Patent: Jul. 7, 2026

(54) VALVE ASSEMBLY

(71) Applicant: JTEKT CORPORATION, Kariya (JP)

(72) Inventors: Tsunehito Watanabe, Ichinomiya (JP);
Natsuki Iwamoto, Okazaki (JP);
Kazushi Numazaki, Toyota (JP);
Tetsuya Tokuno, Kashihara (JP);
Toshikatsu Kubo, Obu (JP); **Kazuki
Okamura, Okazaki (JP); Kazuhiro
Takabayashi**, Okazaki (JP)

(73) Assignee: JTEKT CORPORATION, Kariya (JP)

( * ) Notice: Subject to any disclaimer, the term of this
patent is extended or adjusted under 35
U.S.C. 154(b) by 0 days.

(21) Appl. No.: 18/867,347

(22) PCT Filed: May 11, 2023

(86) PCT No.: PCT/JP2023/017705
§ 371 (c)(1),
(2) Date: Nov. 19, 2024

(87) PCT Pub. No.: WO2023/233959
PCT Pub. Date: Dec. 7, 2023

(65) Prior Publication Data
US 2025/0347347 A1 Nov. 13, 2025

(30) Foreign Application Priority Data

May 30, 2022 (WO) ................. PCT/JP2022/021953
Jan. 11, 2023 (WO) ................. PCT/JP2023/000353
Mar. 23, 2023 (WO) ................. PCT/JP2023/011649

(51) Int. Cl.
F16K 15/18 (2006.01)
F16K 27/02 (2006.01)

(52) U.S. Cl.
CPC .......... F16K 15/182 (2021.08); F16K 15/184
(2021.08); F16K 27/029 (2013.01)

(58) Field of Classification Search
CPC ........... F16K 1/305–307; F16K 15/182; F16K
15/184; F16K 27/029; F16K 15/02;
(Continued)

(56) References Cited

U.S. PATENT DOCUMENTS 4,631,923 A * 12/1986 Smith ..................... F16K 15/18
60/530
5,992,219 A * 11/1999 Otaka ..................... F17C 13/04
73/114.38
(Continued)

FOREIGN PATENT DOCUMENTS

JP 56-034170 U 4/1981
JP 57-059261 U 4/1982
(Continued)

OTHER PUBLICATIONS

International Search Report issued Aug. 1, 2023 in PCT/JP2023/
017705, filed May 11, 2023, 2 pages.
(Continued)

*Primary Examiner* — Craig J Price
(74) *Attorney, Agent, or Firm* — Oblon, McClelland,
Maier & Neustadt, L.L.P.

(57) ABSTRACT

Valve subassemblies include a check valve attached to a first
attachment hole in a body, and an electromagnetic valve
attached to a second attachment hole in the body. A second
flow passage includes a common port, a linear first portion
extending from the common port, a linear second portion
extending from the first portion while being bent, a linear
third portion connecting the first attachment hole to the
second portion, and a linear fourth portion connecting the
second attachment hole to the second portion. The third
portion intersects the second portion at an angle equal to or
smaller than 90° with respect to a first connection point of
the second portion to the first portion. The fourth portion
extends parallel to the second portion from an end opposite
(Continued)

to the first connection point with respect to a second connection point of the second portion to the third portion.

5 Claims, 3 Drawing Sheets

(58) Field of Classification Search
CPC ...... F16K 15/025; F16K 31/42; F16K 31/423; F16K 31/426; F16K 1/36; F16K 15/1826; F16K 31/0655; F16K 27/0209; F16K 27/0254; F17C 13/04; F17C 2265/066; F17C 2221/035; F17C 2221/033; F17C 2223/036; F17C 2223/0123; F17C 2223/0153; F17C 2270/0178; F17C 2205/0146; F17C 2205/0314; F17C 2205/0332; F17C 2205/0341; F17C 2205/0385; F17C 2205/0335; F17C 2205/0391; F17C 2205/0329; F17C 2205/0326; F17C 2270/0168; F17C 2270/0184; F17C 2221/012; Y10T 137/1812; Y10T 137/87507; Y10T 137/87563; Y10T 137/87917; H01M 8/04104; H01M 50/30–333; H01M 8/04089
USPC .. 137/601.14, 613, 601.21, 601.2, 614, 861, 137/886; 62/50.7; 222/3, 6
See application file for complete search history.

(56) References Cited

U.S. PATENT DOCUMENTS

| | | | | |
|---|---|---|---|---|
| 6,367,506 | B1 * | 4/2002 | Takagi ................ | F16K 31/0655 137/119.03 |
| 6,568,375 | B2 * | 5/2003 | Ishikawa ............ | F02M 21/0245 123/529 |
| 6,691,729 | B2 * | 2/2004 | Takeda ................... | F17C 13/04 62/50.7 |
| 7,036,527 | B2 * | 5/2006 | Ezaki ...................... | F25B 41/20 137/881 |
| 7,309,113 | B2 * | 12/2007 | Carter .................... | F17C 13/04 303/1 |
| 9,347,580 | B2 * | 5/2016 | Ninomiya ........... | F16K 31/0675 |
| 9,371,913 | B2 * | 6/2016 | Lhymn ................. | F16K 25/005 |
| 9,404,481 | B2 * | 8/2016 | Oikawa ............... | F04B 53/1082 |
| 9,644,793 | B2 * | 5/2017 | Lee ........................ | F17C 13/04 |
| 9,784,374 | B2 * | 10/2017 | Ikeda .................... | F16K 31/406 |
| 9,929,417 | B2 * | 3/2018 | Nakamura ........ | H01M 8/04089 |
| 10,006,559 | B2 * | 6/2018 | Kubo .................... | F16K 31/408 |
| 10,260,681 | B2 * | 4/2019 | Hanada ................... | F17C 13/04 |
| 10,629,920 | B2 * | 4/2020 | Hori ........................... | F15D 1/04 |
| 10,683,825 | B1 * | 6/2020 | Perry ................. | F02M 63/0021 |
| 10,948,087 | B2 * | 3/2021 | Hausmann ............. | F16K 1/303 |
| 11,448,329 | B2 * | 9/2022 | Numazaki .......... | F16K 31/0655 |
| 11,552,313 | B2 * | 1/2023 | Kim ................... | H01M 8/04201 |
| 11,560,965 | B2 * | 1/2023 | Iwamoto .............. | F16K 27/003 |
| 11,953,153 | B2 * | 4/2024 | Tan .................... | H01M 8/04201 |
| 12,085,074 | B2 * | 9/2024 | Tamura .............. | F16K 31/0675 |
| 12,480,588 | B2 * | 11/2025 | Numazaki ................ | F16K 1/36 |
| 2001/0018929 | A1 | 9/2001 | Taku | |
| 2005/0274422 | A1 * | 12/2005 | Downie ................ | F17C 13/123 137/613 |
| 2006/0104843 | A1 * | 5/2006 | Inoue .................... | F04B 53/164 417/490 |
| 2009/0120412 | A1 * | 5/2009 | Tokuo .................. | F02M 59/102 123/506 |
| 2010/0155633 | A1 * | 6/2010 | Pfaff ...................... | F16K 31/406 251/38 |
| 2014/0203200 | A1 * | 7/2014 | Da Silva ............. | F16K 37/0033 251/129.15 |
| 2015/0184805 | A1 | 7/2015 | Lee | |
| 2016/0305562 | A1 | 10/2016 | Kagomoto et al. | |
| 2018/0087481 | A1 | 3/2018 | Koshimoto et al. | |
| 2019/0323626 | A1 | 10/2019 | Suzuki et al. | |
| 2023/0228381 | A1 * | 7/2023 | Andreas .................. | F17C 13/12 222/3 |

FOREIGN PATENT DOCUMENTS

| | | |
|---|---|---|
| JP | 57-158910 U | 10/1982 |
| JP | 11-351412 A | 12/1999 |
| JP | 2001-317645 A | 11/2001 |
| JP | 2004-92712 A | 3/2004 |
| JP | 2005-76862 A | 3/2005 |
| JP | 2013-041375 A | 2/2013 |
| JP | 2013-53659 A | 3/2013 |
| JP | 2015-523509 A | 8/2015 |
| JP | 2016-205418 A | 12/2016 |
| JP | 2019-87476 A | 6/2019 |
| JP | 2019-190516 A | 10/2019 |
| JP | 2021-135939 A | 9/2021 |
| WO | WO 2016/185681 A1 | 11/2016 |

OTHER PUBLICATIONS

International Search Report issued Aug. 2, 2022 in PCT/JP2022/021953, filed May 30, 2022, 2 pages.
International Search Report issued Apr. 11. 2023 in PCT/JP2023/000353, filed Jan. 11, 2023, 2 pages.
International Search Report issued Jun. 20, 2023 in PCT/JP2023/011649, filed Mar. 23, 2023, 2 pages.

* cited by examiner

VALVE ASSEMBLY

CROSS-REFERENCE TO RELATED APPLICATIONS

This application is national stage application of International Application No. PCT/JP2023/017705, filed on May 11, 2023, which designates the United States, the entire contents of which is incorporated herein by reference.

TECHNICAL FIELD

The present disclosure relates to a valve assembly.

BACKGROUND ART

For example, Patent Document 1 discloses a valve assembly for controlling a gas flow. Such a valve assembly is mounted to, for example, a gas tank of a fuel cell electric vehicle to control a hydrogen gas flow.

The valve assembly of Patent Document 1 includes a body and a plurality of valve subassemblies attached to the body. The valve subassembly includes a check valve that restricts outflow of a hydrogen gas from the gas tank, and an electromagnetic valve that controls feeding of a hydrogen gas to the fuel cell. The body has a gas flow passage through which a hydrogen gas flows, and a plurality of attachment holes for attaching the plurality of valve subassemblies. The plurality of valve subassemblies is attached to the corresponding attachment holes to form the valve assembly.

RELATED ART DOCUMENTS

Patent Documents

Patent Document 1: Japanese Unexamined Patent Application Publication (Translation of PCT Application) No. 2015-523509 (JP 2015-523509 A)

SUMMARY OF THE INVENTION

Problem to be Solved by the Invention

In the above valve assembly, when the hydrogen gas is charged into the gas tank, moisture contained in the hydrogen gas may turn into water droplets and adhere to the valve subassembly. When the moisture is frozen, it may hinder the smooth operation of the valve subassembly. In the above valve assembly, the shape of the gas flow passage is desirably simple, for example, from the viewpoint of ease of manufacture of the body.

Means for Solving the Problem

A valve assembly according to one aspect of the present disclosure includes: a body having a gas flow passage including a first flow passage and a second flow passage, a first attachment hole connected to the first flow passage and the second flow passage, and a second attachment hole connected to the first flow passage and the second flow passage; and a plurality of valve subassemblies. The first flow passage is configured to be connected to a gas tank that stores a gas. The second flow passage is configured to be selectively connected to any one of a plurality of external devices. The plurality of external devices includes a supply source of the gas to be charged into the gas tank, and a consumption device configured to consume the gas fed out of the gas tank. The valve subassemblies include: a check valve attached to the first attachment hole; and an electromagnetic valve attached to the second attachment hole. The first flow passage includes: a charging portion connecting the first attachment hole to the gas tank; and a feeding portion connecting the second attachment hole to the gas tank. The second flow passage includes: a common port that is an inlet for the gas supplied from the supply source and an outlet for the gas to be fed to the consumption device; a linear first portion extending from the common port; a linear second portion extending from the first portion while being bent; a linear third portion connecting the first attachment hole to the second portion; and a linear fourth portion connecting the second attachment hole to the second portion. The check valve is configured to restrict a flow of the gas from the charging portion to the third portion and allow a flow of the gas from the third portion to the charging portion. The electromagnetic valve is configured to control a flow of the gas from the feeding portion to the fourth portion. The third portion intersects the second portion at an angle equal to or smaller than 90° with respect to a first connection point of the second portion to the first portion. The fourth portion extends parallel to the second portion from an end opposite to the first connection point with respect to a second connection point of the second portion to the third portion.

MODES FOR CARRYING OUT THE INVENTION

A valve assembly according to one embodiment will be described below with reference to the drawings.

The term "annular" as used herein refers to the shape of any object that may be considered as annular as a whole, including a plurality of components or parts combined to form an annular shape and an object with a notch etc. in part, such as a C-shaped object. The "annular" shape includes, but is not limited to, a circular shape, an elliptical shape, and a polygonal shape with sharp or rounded corners when viewed in the axial direction. The term "tubular" as used herein refers to the shape of any object that may be considered as tubular as a whole, including a plurality of components or parts combined to form a tubular shape and an object with a notch etc. in part, such as a C-shaped object. The "tubular" shape includes, but is not limited to, a circular shape, an elliptical shape, and a polygonal shape with sharp or rounded corners when viewed in the axial direction.

(Overall Structure)

Figure 1:
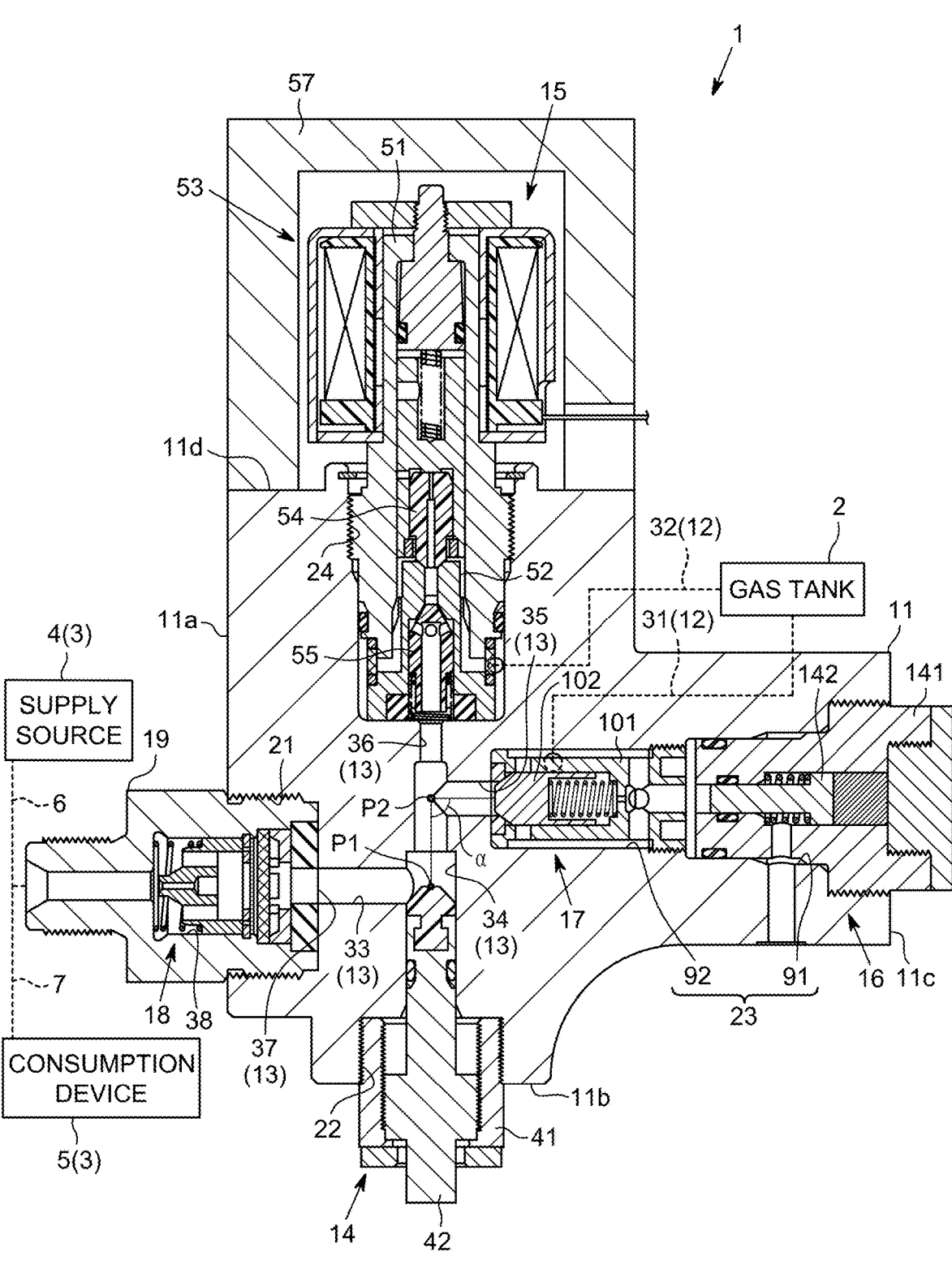
FIG. 1 is a sectional view showing a schematic structure of a valve assembly according to one embodiment.

A valve assembly 1 illustrated in FIG. 1 is mounted to, for example, a gas tank 2 of a fuel cell electric vehicle. The gas tank 2 stores a hydrogen gas at a high pressure of about 72.5 MPa, for example. The valve assembly 1 is selectively connected to any one of a plurality of external devices 3. The plurality of external devices 3 includes a supply source 4 of a hydrogen gas to be charged into the gas tank 2, and a consumption device 5 that consumes the hydrogen gas fed out of the gas tank 2. The supply source 4 is, for example a hydrogen station, and is connected to the valve assembly 1 via a pipe 6. The consumption device 5 is, for example, a fuel cell mounted on an automobile, and is connected to the valve assembly 1 via a pipe 7. The valve assembly 1 controls flows of a hydrogen gas to be charged into the gas tank 2 and a hydrogen gas fed out of the gas tank 2.

The valve assembly 1 includes a body 11 having a gas flow passage, and a plurality of valve subassemblies attached to the body 11. The gas flow passage includes a first flow passage 12 connected to the gas tank 2, and a second flow passage 13 connected to the external device 3. The plurality of valve subassemblies includes, for example, a manual valve 14, a composite valve 15, a safety valve 16, a check valve 17, and an excess flow check valve 18. The plurality of valve subassemblies may include any valve subassembly in addition to or instead of these valve subassemblies. As in the illustration, the valve assembly 1 may further include a joint 19 for connecting the pipe 6 or the pipe 7.

(Body)

The body 11 is made of, for example, a metal material. The body 11 has, for example, a rectangular parallelepiped shape with projections in part. The body 11 in the present embodiment is one seamless and continuous piece. The outer surface of the body 11 includes a first side surface 11*a*, a second side surface 11*b*, a third side surface 11*c*, and a fourth side surface 11*d*. The first side surface 11*a* and the third side surface 11*c* are, for example, parallel to each other. The second side surface 11*b* and the fourth side surface 11*d* are, for example, parallel to each other. The first side surface 11*a* and the third side surface 11*c* are, for example, orthogonal to the second side surface 11*b* and the fourth side surface 11*d*.

The body 11 has a plurality of attachment holes associated with members to be attached to the body 11. The plurality of attachment holes includes, for example, a joint attachment hole 21 for attaching the joint 19, a manual valve attachment hole 22 for attaching the manual valve 14, an integrated attachment hole 23 that is a first attachment hole for attaching the safety valve 16 and the check valve 17, and a composite valve attachment hole 24 that is a second attachment hole for attaching the composite valve 15.

The joint attachment hole 21 is, for example, a round hole, and is open in the first side surface 11*a*. The bottom surface of the joint attachment hole 21 is, for example, a flat surface parallel to the first side surface 11*a*. The manual valve attachment hole 22 is, for example, a round hole, and is open in the second side surface 11*b*. The bottom surface of the manual valve attachment hole 22 is, for example, a flat surface parallel to the second side surface 11*b*. The integrated attachment hole 23 is, for example, a round hole, and is open in the third side surface 11*c*. The integrated attachment hole 23 will be described in detail later. The composite valve attachment hole 24 is, for example, a round hole, and is open in the fourth side surface 11*d*. The bottom surface of the composite valve attachment hole 24 is a flat surface parallel to the fourth side surface 11*d*.

The first flow passage 12 includes a charging portion 31 that communicates the integrated attachment hole 23 with the gas tank 2, and a feeding portion 32 that communicates the composite valve attachment hole 24 with the gas tank 2. The charging portion 31 is open in, for example, the inner circumferential surface of the integrated attachment hole 23. Thus, the safety valve 16 and the check valve 17 are connected to the gas tank 2 via the charging portion 31. The feeding portion 32 is open in, for example, the inner circumferential surface of the composite valve attachment hole

24. Thus, the composite valve 15 is connected to the gas tank 2 via the feeding portion 32. As in the illustration, the charging portion 31 and the feeding portion 32 may be separate flow passages. In the present embodiment, the flow passage sectional area of the charging portion 31 is larger than the flow passage sectional area of the feeding portion 32 over the entire region.

The second flow passage 13 includes a first portion 33, a second portion 34, a third portion 35, and a fourth portion 36. In the present embodiment, the entire second flow passage 13, the joint attachment hole 21, the manual valve attachment hole 22, the integrated attachment hole 23, and the composite valve attachment hole 24 are disposed in the same plane.

The first portion 33 is open in the bottom surface of the joint attachment hole 21. Thus, the first portion 33 is connected to the supply source 4 or the consumption device 5 via the joint 19. That is, the open end of the first portion 33 is used as a common port 37 that is an inlet for the hydrogen gas supplied from the supply source 4 and an outlet for the hydrogen gas to be fed to the consumption device 5. Thus, the second flow passage 13 includes the common port 37. The first portion 33 extends linearly from the bottom surface of the joint attachment hole 21 in a direction orthogonal to the first side surface 11a.

The second portion 34 is open in the bottom surface of the manual valve attachment hole 22. The second portion 34 extends linearly from the bottom surface of the manual valve attachment hole 22 in a direction orthogonal to the second side surface 11*b*, and intersects the first portion 33. Thus, the second portion 34 is orthogonal to the first portion 33. The bore diameter of the second portion 34 on a far side from the intersection with the first portion 33 is smaller than the bore diameter of the second portion 34 on a near side to the intersection. That is, the second portion 34 has a stepped portion.

The third portion 35 is open in, for example, the bottom surface of the integrated attachment hole 23. The third portion 35 extends linearly from the bottom surface of the integrated attachment hole 23 in a direction orthogonal to the third side surface 11*c*, and intersects the second portion 34. Thus, the third portion 35 is orthogonal to the second portion 34. The third portion 35 communicates the second portion 34 with the integrated attachment hole 23. As in the illustration, the third portion 35 is orthogonal to, for example, the small diameter portion of the second portion 34.

The fourth portion 36 is open in, for example, the bottom surface of the composite valve attachment hole 24. The fourth portion 36 extends linearly from the bottom surface of the composite valve attachment hole 24 in a direction orthogonal to the fourth side surface 11*d*. That is, the fourth portion 36 extends linearly in a direction parallel to the second portion 34. The fourth portion 36 is connected to the tip portion of the second portion 34. The fourth portion 36 communicates the second portion 34 with the composite valve attachment hole 24. In the present embodiment, the fourth portion 36 is provided, for example, coaxially with the second portion 34.

Thus, the second flow passage 13 connects the joint attachment hole 21 (external device) to the composite valve attachment hole 24 (composite valve 15) and the integrated attachment hole 23 (safety valve 16 and check valve 17). The passage between the common port 37 and the fourth portion 36 in the second flow passage 13 is bent at a right angle only at one location between the first portion 33 and the second portion 34. That is, the passage between the common port 37 and the fourth portion 36 in the second flow passage 13 has an L-shape. Further, the passage between the common port 37 and the third portion 35 is bent at a right angle between the first portion 33 and the second portion 34, and is also bent at a right angle away from the first portion 33 between the second portion 34 and the third portion 35. That is, the passage between the common port 37 and the third portion 35 has a crank shape. The connection point of the second portion 34 to the first portion 33 is a first connection point P1, and the connection point of the second portion 34 to the third portion 35 is a second connection point P2. An angle $\alpha$ of the third portion 35 from the second portion 34 with respect to the first connection point P1 is substantially 90° in the illustrated example. In other words, the third portion 35 intersects the second portion 34 at substantially 90° with respect to the first connection point P1. The fourth portion 36 extends parallel to the second portion 34 from the tip portion that is an end opposite to the first connection point P1 with respect to the second connection point P2.

The joint 19 is made of, for example, a metal material. The joint 19 has, for example, a columnar shape. The joint 19 has a joint flow passage 38. The joint flow passage 38 extends linearly, for example, along the axial direction of the joint 19 and is open in both end faces of the joint 19. The joint 19 is fixed to the joint attachment hole 21 by any fixing method such as screw fastening or press fitting. In this way, the joint flow passage 38 communicates with the first portion 33. One of the pipes 6, 7 is connected to the joint 19. Thus, the supply source 4 or the consumption device 5 is connected to the second flow passage 13 via the joint flow passage 38.

(Plurality of Valve Subassemblies)

The manual valve 14 includes a manual valve housing 41 and a manual valve body 42. The manual valve housing 41 has, for example, a tubular shape. In the present embodiment, the manual valve housing 41 has a circular shape when viewed in the axial direction. The manual valve housing 41 is fixed to the manual valve attachment hole 22 by any fixing method such as screw fastening or press fitting. The manual valve body 42 has, for example, a columnar shape. The manual valve body 42 is housed in the manual valve housing 41, for example, by screw fastening so as to be movable along the second portion 34 of the second flow passage 13 and to be able to keep its position in the manual valve housing 41.

In the manual valve 14 structured in this way, the tip portion of the manual valve body 42 abuts against the stepped portion of the second portion 34 to restrict the flow of the hydrogen gas between the first portion 33 and the second portion 34. The tip portion of the manual valve body 42 moves away from the stepped portion of the second portion 34 to allow the flow of the hydrogen gas between the first portion 33 and the second portion 34.

The composite valve 15 is attached to the composite valve attachment hole 24. The composite valve 15 includes an electromagnetic valve portion that functions as an electromagnetic valve, and a check valve portion that functions as a check valve. The electromagnetic valve portion corresponds to an electromagnetic valve that is a valve subassembly, and the check valve portion corresponds to a second check valve that is a valve subassembly. That is, the electromagnetic valve and the second check valve are attached to the single composite valve attachment hole 24. The composite valve 15 controls the flow of the hydrogen gas between the feeding portion 32 of the first flow passage 12 and the fourth portion 36 of the second flow passage 13. The composite valve 15 will be described in detail later.

The safety valve 16 has an inlet 165 described later. When the temperature of the safety valve 16 is equal to or lower than a threshold temperature, the safety valve 16 is in a closed state in which the hydrogen gas flowing into the inlet 165 is not released to the outside. When the temperature of the safety valve 16 exceeds the threshold temperature, the safety valve 16 irreversibly changes from the closed state to an open state. In the open state, the safety valve 16 releases the hydrogen gas flowing into the inlet 165 to the outside. The threshold temperature is preset so that the pressure of the hydrogen gas in the gas tank 2 does not become excessive and damage the gas tank 2. The safety valve 16 will be described in detail later.

The check valve 17 that is a first check valve is configured to prevent backflow of the gas charged into the gas tank 2. Specifically, the check valve 17 restricts the flow of the hydrogen gas from the charging portion 31 of the first flow passage 12 to the third portion 35 of the second flow passage 13 and allows the flow of the hydrogen gas from the third portion 35 to the charging portion 31. The check valve 17 will be described in detail later.

The excess flow check valve 18 is provided in the joint flow passage 38. The excess flow check valve 18 is configured to restrict the flow of the hydrogen gas when the flow rate of the hydrogen gas flowing in a predetermined direction through the joint flow passage 38 (second flow passage 13) exceeds a predetermined rate. The predetermined direction is, for example, a direction in which the hydrogen gas is fed out of the gas tank 2 to the consumption device 5. The excess flow check valve 18 does not limit the flow rate of the hydrogen gas in a direction opposite to the predetermined direction, that is, a direction in which the hydrogen gas is charged from the supply source 4 into the gas tank 2.

(Composite Valve 15)

Figure 2:
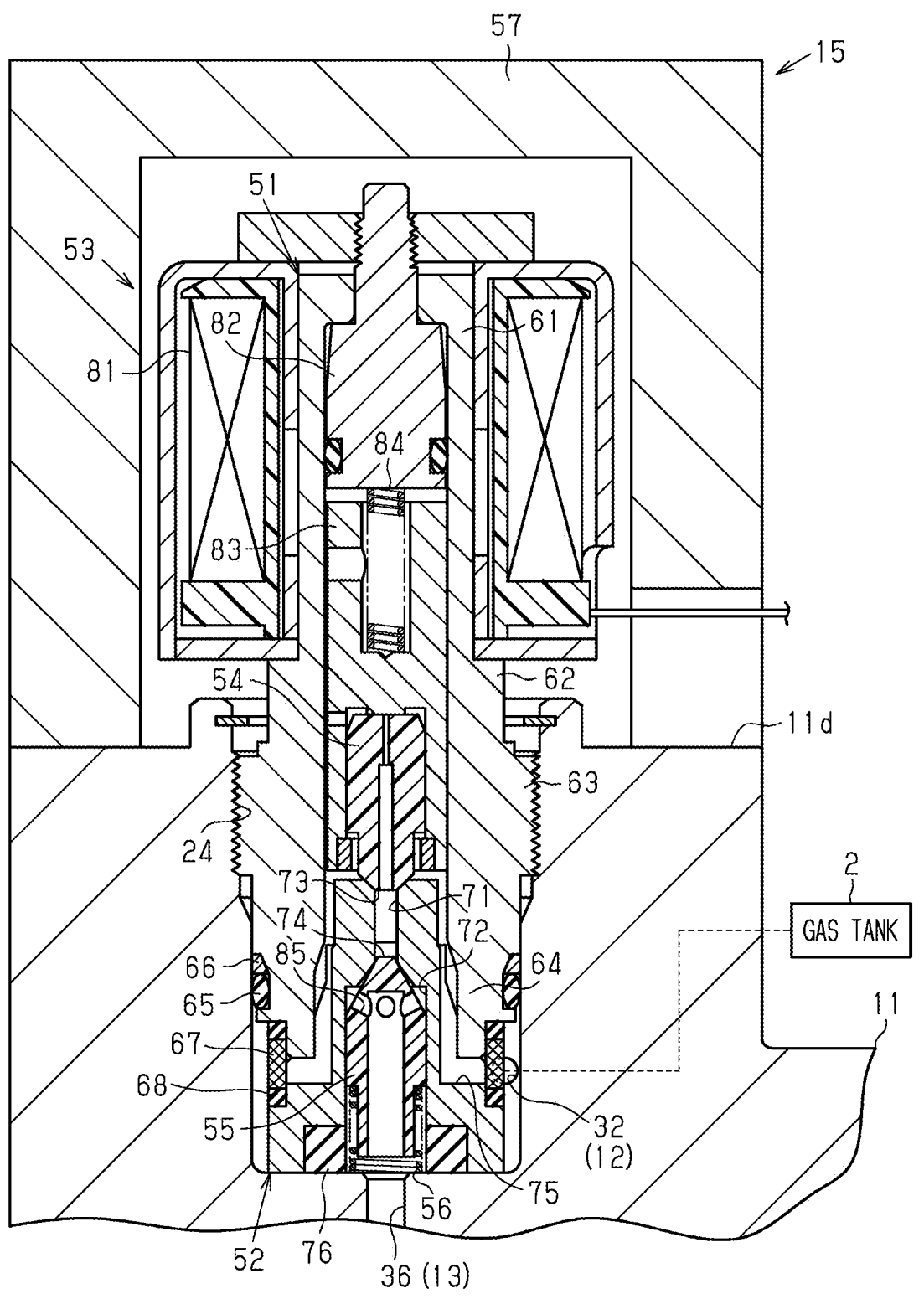
FIG. 2 is an enlarged sectional view of the vicinity of a composite valve in the valve assembly in FIG. 1.

As illustrated in FIG. 2, the composite valve 15 includes a sleeve 51, a plug 52, a solenoid actuator 53, an electromagnetic valve body 54, a check valve body 55, and a check valve biasing member 56. The composite valve 15 may further include a cover 57.

In the composite valve 15, the sleeve 51, the plug 52, the solenoid actuator 53, and the electromagnetic valve body 54 constitute the electromagnetic valve portion. The electromagnetic valve portion controls the flow of the hydrogen gas between the feeding portion 32 and the fourth portion 36. In the composite valve 15, the plug 52, the check valve body 55, and the check valve biasing member 56 constitute the check valve portion. The check valve portion allows the flow of the hydrogen gas from the feeding portion 32 to the fourth portion 36 and restricts the flow of the hydrogen gas from the fourth portion 36 to the feeding portion 32. This suppresses action of a high-pressure hydrogen gas on the electromagnetic valve portion when charging the hydrogen gas etc. The check valve portion is disposed between the electromagnetic valve portion and the fourth portion 36 of the second flow passage 13. In other words, the electromagnetic valve portion is connected to the fourth portion 36 via the check valve portion. In the present embodiment, the electromagnetic valve portion is disposed coaxially with the check valve portion.

Specifically, the sleeve 51 is made of, for example, a metal material. The sleeve 51 has, for example, a tubular shape with one closed end. In the present embodiment, the sleeve 51 has a circular shape when viewed in the axial direction. The sleeve 51 has a stepped shape in which its outside diameter varies stepwise along the axial direction.

Specifically, the sleeve 51 includes, in order from one end side, a small diameter portion 61, an intermediate portion 62, a large diameter portion 63, and a tip portion 64. The outside diameter of the small diameter portion 61 is smaller than the outside diameter of the intermediate portion 62. The outside diameter of the intermediate portion 62 is smaller than the outside diameter of the large diameter portion 63. The outside diameter of the tip portion 64 is smaller than the outside diameter of the large diameter portion 63.

The sleeve 51 is fixed to the composite valve attachment hole 24 by any fixing method such as screw fastening or press fitting. When the sleeve 51 is attached to the composite valve attachment hole 24, the large diameter portion 63 and the tip portion 64 are inserted into the composite valve attachment hole 24, and the small diameter portion 61 and the intermediate portion 62 protrude from the body 11. A seal member 65 and a backup ring 66 are provided on the outer circumferential surface of the large diameter portion 63. This provides a seal between the inner circumferential surface of the composite valve attachment hole 24 and the large diameter portion 63.

The plug 52 is made of, for example, a metal material. The plug 52 has, for example, a stepped columnar shape. The plug 52 is fixed to the tip portion 64 of the sleeve 51 and disposed between the sleeve 51 and the bottom surface of the composite valve attachment hole 24. The plug 52 is fixed to the tip portion 64 by any fixing method such as screw fastening or press fitting so as to be movable together with the sleeve 51. For example, as in the illustration, the plug 52 is fixed so as to be disposed coaxially with the sleeve 51. Thus, the check valve portion is disposed coaxially with the electromagnetic valve portion. A filter 67 and a seal member 68 may be provided between the tip portion 64 of the sleeve 51 and the outer circumferential edge of the plug 52.

The plug 52 has an internal flow passage 71 and a housing hole 72 that is continuous with the internal flow passage 71. The internal flow passage 71 includes a first opening 73 to be opened and closed by the electromagnetic valve body 54, and a second opening 74 to be opened and closed by the check valve body 55. The internal flow passage 71 has, for example, a linear shape along the axis of the plug 52. The outer circumferential surface of the plug 52 is provided with one or more communication grooves 75 that extend so as to communicate the inside and the outside of the sleeve 51. Thus, the first opening 73 communicates with the feeding portion 32 of the first flow passage 12 via the communication groove 75. The second opening 74 communicates with the fourth portion 36 of the second flow passage 13 via the housing hole 72. A seal member 76 is provided between the plug 52 and the bottom surface of the composite valve attachment hole 24. This provides a seal between the bottom surface of the composite valve attachment hole 24 and the plug 52.

The solenoid actuator 53 includes a solenoid coil 81, a fixed core 82, a movable core 83, and an electromagnetic valve biasing member 84.

The solenoid coil 81 has, for example, a tubular shape. In the present embodiment, the solenoid coil 81 has a circular shape when viewed in the axial direction. The solenoid coil 81 is fixed to the outer circumference of the small diameter portion 61. The fixed core 82 is made of a magnetic material. The fixed core 82 is fixed in the sleeve 51. The movable core 83 is made of a magnetic material. The movable core 83 has, for example, a columnar shape. The movable core 83 is slidable in the axial direction within the sleeve 51. The movable core 83 is connected to the electromagnetic valve body 54 so as to be slidable in the axial direction together with the electromagnetic valve body 54. The electromagnetic valve body 54 is made of, for example, a resin material, but may be made of a metal material.

A known pilot valve mechanism is incorporated in the movable core 83 of the present embodiment. Therefore, only the movable core 83 moves before the movable core 83 and the electromagnetic valve body 54 move together, thereby allowing a small amount of the hydrogen gas to flow from the feeding portion 32 of the first flow passage 12 to the internal flow passage 71. Another embodiment may be such that the pilot valve mechanism is not incorporated in the movable core 83 and the electromagnetic valve body 54 is fixed to the movable core 83 so that the electromagnetic valve body 54 is slidable in the axial direction completely together with the movable core 83.

The electromagnetic valve body 54 is biased toward the first opening 73 of the plug 52 via the movable core 83 by the electromagnetic valve biasing member 84. The electromagnetic valve biasing member 84 is, for example, a compression coil spring. When the electromagnetic valve body 54 is seated on the circumferential edge of the first opening 73, the first opening 73 is closed. When the electromagnetic valve body 54 moves away from the circumferential edge of the first opening 73, the first opening 73 is opened. That is, the circumferential edge of the first opening 73 of the plug 52 is used as a valve seat for the electromagnetic valve body 54. In another embodiment, a valve seat separate from the plug 52 may be provided on the circumferential edge of the first opening 73.

The check valve body 55 is made of, for example, a resin material, but may be made of a metal material. The check valve body 55 has, for example, a tubular shape with one closed end. In the present embodiment, the check valve body 55 has a circular shape when viewed in the axial direction. The check valve body 55 is housed in the housing hole 72 of the plug 52 so as to be slidable in the axial direction. That is, the check valve body 55 is disposed on the opposite side of the electromagnetic valve body 54 from the plug 52. The tubular portion of the check valve body 55 has lateral holes 85 passing therethrough in the radial direction. The check valve body 55 is biased toward the second opening 74 of the plug 52 by the check valve biasing member 56. The check valve biasing member 56 is, for example, a compression coil spring. When the check valve body 55 is seated on the circumferential edge of the second opening 74, the second opening 74 is closed. When the check valve body 55 moves away from the circumferential edge of the second opening 74, the second opening 74 is opened. That is, the circumferential edge of the second opening 74 of the plug 52 is used as a valve seat for the check valve body 55. In another embodiment, a valve seat separate from the plug 52 may be provided on the circumferential edge of the second opening 74.

The cover 57 is made of, for example, a metal material or a resin material. The cover 57 has, for example, a tubular shape with one closed end. In the present embodiment, the cover 57 has a circular shape when viewed in the axial direction. The cover 57 houses a portion of the composite valve 15 exposed from the composite valve attachment hole 24. The cover 57 is fixed to the fourth side surface 11*d* of the body 11 by a known fixing method such as a bolt or a snap-fit structure (not illustrated).

In the composite valve 15 structured in this way, when no electric power is supplied to the solenoid coil 81, the electromagnetic valve body 54 is seated on the circumferential edge of the first opening 73 by the biasing force of the electromagnetic valve biasing member 84, and the first opening 73 is closed. In this state, the check valve body 55 is seated on the circumferential edge of the second opening 74 by the biasing force of the check valve biasing member 56, and the second opening 74 is closed. In this way, the composite valve 15 is in a closed state when the solenoid coil 81 is not energized. Therefore, the flow of the hydrogen gas from the feeding portion 32 of the first flow passage 12 to the fourth portion 36 of the second flow passage 13 is restricted.

When electric power is supplied to the solenoid coil 81, the electromagnetic valve body 54 is attracted to the fixed core 82 together with the movable core 83 to move away from the circumferential edge of the first opening 73, and the first opening 73 is opened. Then, the check valve body 55 is moved away from the circumferential edge of the second opening 74 by the pressure of the hydrogen gas flowing into the internal flow passage 71, and the second opening 74 is opened. In this way, the composite valve 15 is in an open state when the solenoid coil 81 is energized. Therefore, the flow of the hydrogen gas from the feeding portion 32 of the first flow passage 12 to the fourth portion 36 of the second flow passage 13 is allowed.

(Integrated Attachment Hole 23)

Figure 3:
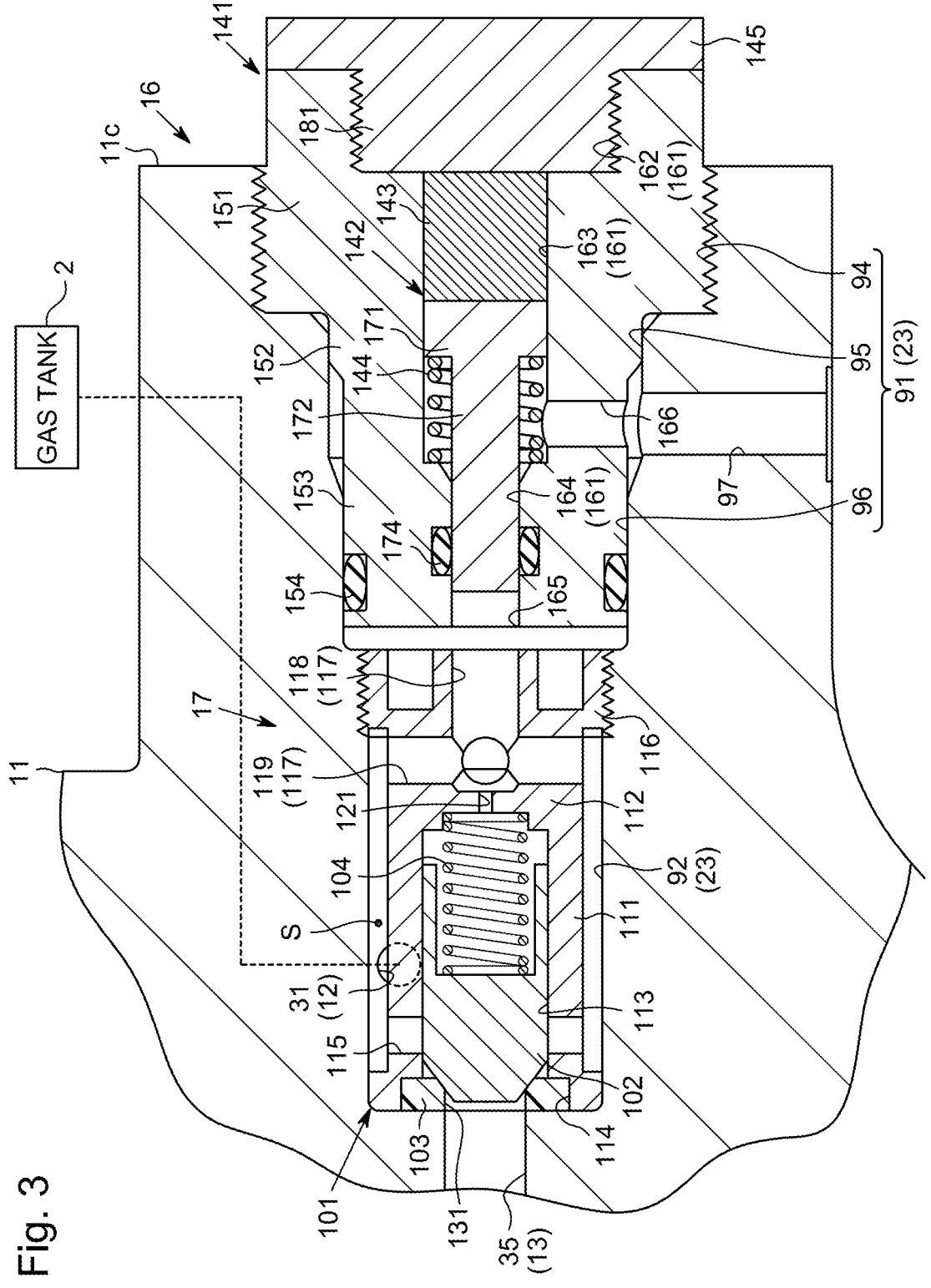
FIG. 3 is an enlarged sectional view of the vicinity of a safety valve and a check valve in the valve assembly in FIG. 1.

As illustrated in FIG. 3, the integrated attachment hole 23 includes a safety valve attachment hole 91 to which the safety valve 16 is attached, and a check valve attachment hole 92 to which the check valve 17 is attached. The safety valve attachment hole 91 is open in the third side surface 11c that is the outer surface of the body 11. The check valve attachment hole 92 is open in the bottom surface of the safety valve attachment hole 91. That is, the check valve attachment hole 92 is provided on a deep side of the safety valve attachment hole 91 so as to be aligned linearly with the safety valve attachment hole 91. In the following description, the open end side of the integrated attachment hole 23 (safety valve attachment hole 91) will be referred to as a first side, and the opposite side, that is, the bottom surface side of the integrated attachment hole 23 (check valve attachment hole 92) will be referred to as a second side.

For example, as in the illustration, the safety valve attachment hole 91 is a stepped hole having a bore diameter that decreases stepwise toward the second side. Specifically, the safety valve attachment hole 91 includes, in order from the first side, a large diameter hole portion 94, a medium diameter hole portion 95, and a small diameter hole portion 96. The bore diameter of the safety valve attachment hole 91 decreases in the order of the large diameter hole portion 94, the medium diameter hole portion 95, and the small diameter hole portion 96. The large diameter hole portion 94 is open in the third side surface 11c. A release passage 97 is open in the inner circumferential surface of the medium diameter hole portion 95. The release passage 97 extends, for example, in a direction orthogonal to an axis of the safety valve attachment hole 91, and is open in the outer surface of the body 11. The small diameter hole portion 96 communicates with the check valve attachment hole 92. The bottom surfaces of the large diameter hole portion 94 and the small diameter hole portion 96 are, for example, flat surfaces parallel to the third side surface 11c. The bottom surface of the medium diameter hole portion 95 is, for example, a tapered surface having a bore diameter that gradually decreases toward the second side.

For example, as in the illustration, the check valve attachment hole 92 has a substantially constant bore diameter over the entire length along its axis. Internal threads are provided at the end of the inner circumferential surface of the check valve attachment hole 92 on the first side. The bottom surface of the check valve attachment hole 92 is, for example, a flat surface parallel to the third side surface 11c. The check valve attachment hole 92 is open in the bottom surface of the safety valve attachment hole 91 and is therefore continuous with the small diameter hole portion 96. The charging portion 31 of the first flow passage 12 is open in the inner circumferential surface of the check valve attachment hole 92. The opening of the charging portion 31 constitutes the outlet of the check valve 17. In another embodiment, the charging portion 31 may be open in, for example, the inner circumferential surface of the safety valve attachment hole 91 closer to the bottom surface. The third portion 35 of the second flow passage 13 is open in the bottom surface of the check valve attachment hole 92. The opening of the third portion 35 constitutes the inlet of the check valve 17. As described above, the check valve attachment hole 92 is not open in the outer surface of the body 11. In other words, the body 11 does not have an opening for the check valve attachment hole 92 on its outer surface. The check valve attachment hole 92 is provided coaxially with the safety valve attachment hole 91. Thus, the check valve 17 is disposed coaxially with the safety valve 16.

(Check Valve 17)

The check valve 17 includes a check valve housing 101 and a check valve body 102. The check valve 17 may further include a valve seat 103 and a check valve biasing member 104.

The check valve housing 101 is made of, for example, a metal material. The check valve housing 101 defines a space S between the check valve housing 101 and the inner circumferential surface of the check valve attachment hole 92. The check valve housing 101 has, for example, a tubular shape with a closed end on the first side. In the present embodiment, the check valve housing 101 has a circular shape when viewed in the axial direction. Specifically, the check valve housing 101 includes a tubular portion 111 and an end wall portion 112 provided at the end of the tubular portion 111 on the first side. The inside of the tubular portion 111 serves as a housing hole 113 that is open to the second side. An enlarged diameter hole portion 114 is provided at the end of the housing hole 113 on the second side. The bore diameter of the enlarged diameter hole portion 114 is larger than the bore diameter of the portion of the housing hole 113 on the first side. The outside diameter of the tubular portion 111 is smaller than the bore diameter of the check valve attachment hole 92 except for the end on the second side. The outside diameter of the end of the tubular portion 111 on the second side is substantially equal to the bore diameter of the check valve attachment hole 92. The tubular portion 111 has one or more lateral holes 115 passing therethrough in the radial direction. The lateral hole 115 is provided on the first side with respect to the end of the tubular portion 111 on the second side.

The end wall portion 112 includes a threaded portion 116. External threads are provided on the outer circumferential surface of the threaded portion 116. The threaded portion 116 is provided, for example, on the end of the end wall portion 112 on the first side. The outside diameter of the end wall portion 112 is smaller than the bore diameter of the check valve attachment hole 92 except for the threaded portion 116. For example, as in the illustration, the outside diameter of the end wall portion 112 except the threaded portion 116 may be equal to the outside diameter of the tubular portion 111. The check valve housing 101 is fixed immovably in the check valve attachment hole 92 by screw fastening of the threaded portion 116 to the check valve attachment hole 92. Thus, the tubular space S that communicates with the charging portion 31 is formed between the inner circumferential surface of the check valve attachment hole 92 and the outer circumferential surface of the check valve housing 101.

The end wall portion 112 has a communication passage 117 that communicates, via the space S, the charging portion 31 (the outlet of the check valve) of the first flow passage 12 with the safety valve 16. For example, as in the illustration, the communication passage 117 includes a vertical passage 118 extending along the axis of the check valve housing 101, and one or more lateral passages 119 orthogonal to the axis. One end of the lateral passage 119 is open in the outer circumferential surface of the end wall portion 112, and the other end of the lateral passage 119 is open to the vertical passage 118. The end of the vertical passage 118 on the first side constitutes the inlet of the safety valve 16 and is open in the bottom surface of the safety valve attachment hole 91. The end of the vertical passage 118 on the first side may be referred to as the outlet of the check valve 17 on the safety valve 16 side. The end wall portion 112 further has a back pressure hole 121 that communicates the housing hole 113 with the communication passage 117. The back pressure hole 121 has, for example, a linear shape extending parallel to the vertical passage 118.

The valve seat 103 is made of, for example, a resin material. The valve seat 103 has an annular shape. The valve seat 103 has a valve port 131 passing therethrough along its axis. The valve seat 103 is disposed in the enlarged diameter hole portion 114 of the check valve housing 101. The valve seat 103 is sandwiched between the bottom surface of the check valve attachment hole 92 and the check valve housing 101 by fixing the check valve housing 101 into the check valve attachment hole 92. Thus, the space between the bottom surface of the check valve attachment hole 92 and the check valve housing 101 is sealed by the valve seat 103.

The check valve body 102 is made of, for example, a metal material, but may be made of a resin material. The check valve body 102 has, for example, a columnar shape. The check valve body 102 is configured to open or close the valve port 131 of the valve seat 103. For example, the end of the check valve body 102 on the second side has a tapered shape having an outside diameter that gradually decreases toward the second side. The check valve body 102 is slidably housed in the housing hole 113 of the check valve housing 101. The check valve biasing member 104 is, for example, a compression coil spring. The check valve biasing member 104 is disposed in the housing hole 113 so as to bias the check valve body 102 to the second side.

The check valve 17 structured in this way is brought into a closed state when the check valve body 102 is seated on the valve seat 103 and the valve port 131 is closed. Thus, the check valve 17 restricts the flow of the hydrogen gas between the charging portion 31 of the first flow passage 12 and the third portion 35 of the second flow passage 13. The check valve 17 is brought into an open state when the check valve body 102 moves away from the valve seat 103 and the valve port 131 is opened. Thus, the check valve 17 allows the flow of the hydrogen gas between the charging portion 31 and the third portion 35.

(Safety Valve 16)

The safety valve 16 includes a safety valve housing 141, a safety valve body 142, and a plug body 143. The safety valve 16 may further include a safety valve biasing member 144 and a fastener 145.

The safety valve housing 141 is made of, for example, a metal material. The safety valve housing 141 has, for example, a stepped columnar shape. Specifically, the safety valve housing 141 includes, in order from the first side, a head portion 151, a fitting portion 152, and a shaft portion 153. The outside diameter of the safety valve housing 141 decreases in the order of the head portion 151, the fitting portion 152, and the shaft portion 153. At the head portion 151, the safety valve housing 141 is fixed to the safety valve attachment hole 91 by any fixing method such as screw fastening or press fitting.

The outside diameter of the fitting portion 152 is substantially equal to the bore diameter of the medium diameter hole portion 95 of the safety valve attachment hole 91. The outside diameter of the shaft portion 153 is substantially equal to the bore diameter of the small diameter hole portion 96 of the safety valve attachment hole 91. A seal member 154 is provided at the end of the outer circumferential surface of the shaft portion 153 on the second side. This provides a seal between the small diameter hole portion 96 and the shaft portion 153 of the safety valve housing 141.

The length of the shaft portion 153 along the axis is larger than the length of the small diameter hole portion 96 along the axis. Thus, part of the shaft portion 153 is disposed in the medium diameter hole portion 95 with the safety valve housing 141 attached to the safety valve attachment hole 91. When the safety valve housing 141 is attached to the safety valve attachment hole 91, a clearance may be formed between the shaft portion 153 and the check valve housing 101 as in the illustration, or the shaft portion 153 may abut against the check valve housing 101.

The safety valve housing 141 has a through hole 161 passing therethrough along the axis. For example, as in the illustration, the through hole 161 is a stepped hole having a bore diameter that decreases stepwise toward the second side. Specifically, the through hole 161 includes, in order from the first side, a first hole portion 162, a second hole portion 163, and a third hole portion 164. The bore diameter of the through hole 161 decreases in the order of the first hole portion 162, the second hole portion 163, and the third hole portion 164. A seal member 174 is provided on the inner circumferential surface of the third hole portion 164. The end of the third hole portion 164 on the second side is used as the inlet 165 of the safety valve 16. The inlet 165 faces the communication passage 117 of the check valve housing 101. Thus, the inlet 165 communicates with the charging portion 31 of the first flow passage 12 via the communication passage 117 and the space S. As described above, the check valve 17 switches the open and closed states when the check valve body 102 moves in the housing hole 113, but the movement of the check valve body 102 does not change the structures of the communication passage 117 and the space S. Therefore, the inlet 165 communicates with the first flow passage 12 regardless of the open or closed state of the check valve 17.

The safety valve housing 141 further has a communication hole 166. The communication hole 166 extends linearly, for example, in a direction orthogonal to the axis. One end of the communication hole 166 is open in the inner circumferential surface of the second hole portion 163, and the other end of the communication hole 166 is open in a portion of the outer circumferential surface of the shaft portion 153 that is disposed in the medium diameter hole portion 95. Thus, the inside of the second hole portion 163 communicates with the outside via the communication hole 166 and the release passage 97.

The safety valve body 142 is made of, for example, a metal material. The safety valve body 142 has, for example, a stepped columnar shape. Specifically, the safety valve body 142 includes, in order from the first side, a base portion 171 and a pin portion 172. The length of the safety valve body 142 along the axis is smaller than the length of the second hole portion 163 along the axis. Thus, when the pin portion 172 is removed from the third hole portion 164, the entire safety valve body 142 can be housed in the second hole portion 163.

The outside diameter of the base portion 171 is substantially equal to the bore diameter of the second hole portion 163. The outside diameter of the pin portion 172 is substantially equal to the bore diameter of the third hole portion 164. The end of the outer circumferential surface of the pin portion 172 on the second side is surrounded by the seal member 174. This provides a seal between the third hole portion 164 and the pin portion 172.

The safety valve biasing member 144 is, for example, a compression coil spring. The safety valve biasing member 144 is attached to the outer circumference of the pin portion 172. The safety valve biasing member 144 is disposed in a compressed state between the base portion 171 and a stepped portion between the second hole portion 163 and the third hole portion 164. Thus, the safety valve biasing member 144 biases the safety valve body 142 to the first side.

The plug body 143 is made of, for example, a fusible alloy. An example of the fusible alloy is a bismuth-indium-based alloy. The melting point of the plug body 143 is the threshold temperature. The plug body 143 is disposed at the end of the second hole portion 163 on the first side. The plug body 143 has, for example, a columnar shape with an outside diameter substantially equal to the bore diameter of the second hole portion 163. The length of the plug body 143 along the axis is set so that the total length of the plug body 143 and the safety valve body 142 is larger than the length of the second hole portion 163. Thus, when the solid plug body 143 is disposed in the second hole portion 163, the third hole portion 164 is kept in a closed state by the pin portion 172. In another embodiment, the plug body 143 may be a glass bulb that breaks at the threshold temperature.

The fastener 145 has, for example, a stepped columnar shape. Specifically, the fastener 145 includes a columnar holding portion 181 that protrudes to the second side. The fastener 145 is fixed to the safety valve housing 141 by any fixing method such as screw fastening or press fitting, and closes the opening of the through hole 161 on the first side. The holding portion 181 abuts against the plug body 143. This prevents the safety valve body 142 and the plug body 143 from falling off from the second hole portion 163 due to the pressure of the hydrogen gas flowing into the third hole portion 164, that is, into the safety valve 16, via the inlet 165.

In the safety valve 16 structured in this way, when the temperature is equal to or lower than the threshold temperature, the third hole portion 164 is closed by the safety valve body 142. That is, the safety valve 16 is in the closed state. Therefore, even if the hydrogen gas in the gas tank 2 flows into the safety valve 16 through the inlet 165, the hydrogen gas is not released to the outside. When the temperature of the safety valve 16 exceeds the threshold temperature, the plug body 143 is fused and the safety valve body 142 is pushed into the second hole portion 163 by the pressure of the hydrogen gas and the biasing force of the safety valve biasing member 144. As a result, the third hole portion 164 is opened. That is, the safety valve 16 is in the open state. Therefore, the hydrogen gas that flows into the safety valve 16 from the third hole portion 164 is released to the outside via the second hole portion 163, the communication hole 166, and the release passage 97.

(Operations of Valve Assembly)

When charging the hydrogen gas into the gas tank 2, the supply source 4 is connected to the joint 19 via the pipe 6. When the hydrogen gas is supplied from the supply source 4, the hydrogen gas flows into the check valve 17 via the joint flow passage 38 and the first portion 33, the second portion 34, and the third portion 35 of the second flow passage 13. As described above, the check valve 17 is configured to allow the flow of the hydrogen gas from the third portion 35 to the charging portion 31, and is therefore in the open state. Specifically, the check valve body 102 moves to the first side by the pressure of the hydrogen gas, and the check valve 17 is brought into the open state. As a result, the first flow passage 12 communicates with the charging portion 31 of the first flow passage 12 via the lateral hole 115 and the space S of the check valve housing 101. Thus, the hydrogen gas is charged into the gas tank 2 via the charging portion 31. At this time, the hydrogen gas also flows into the check valve portion of the composite valve 15 via the second portion 34 to the fourth portion 36 of the second flow passage 13. However, the check valve portion is configured to restrict the flow of the hydrogen gas from the fourth portion 36 to the feeding portion 32, and is therefore in the closed state. Thus, the hydrogen gas does not flow from the second flow passage 13 into the feeding portion 32.

When feeding the hydrogen gas to the consumption device 5, the consumption device 5 is connected to the joint 19 via the pipe 7. The hydrogen gas in the gas tank 2 flows into the composite valve 15 via the feeding portion 32 of the first flow passage 12. When the electromagnetic valve portion of the composite valve 15 is controlled into the open state, the hydrogen gas flows into the check valve portion. The check valve portion is configured to allow the flow of the hydrogen gas from the feeding portion 32 to the fourth portion 36, and is therefore in the open state. Thus, the hydrogen gas flows into the fourth portion 36, the second portion 34, and the first portion 33 of the second flow passage 13 and the joint flow passage 38, and is fed to the consumption device 5 via the pipe 7. At this time, the hydrogen gas also flows into the check valve 17 via the second portion 34 to the third portion 35 of the second flow passage 13. However, the check valve 17 is in the closed state by the pressure of the hydrogen gas stored in the gas tank 2. Thus, the hydrogen gas does not flow from the third portion 35 into the charging portion 31.

In this way, the second flow passage 13 is used as a hydrogen gas charging passage and a hydrogen gas supply passage. In other words, part of the hydrogen gas charging passage and part of the hydrogen gas supply passage are shared.

Next, the functions and effects of the present embodiment will be described.

(1) The third portion 35 intersects the second portion 34 at substantially 90° with respect to the first connection point P1. The fourth portion 36 extends parallel to the second portion 34 from the tip portion opposite to the first connection point P1 with respect to the second connection point P2. Therefore, there is only one bent portion in the passage between the common port 37 and the fourth portion 36 (i.e., the electromagnetic valve portion of the composite valve 15). Thus, the complication of the shape of the second flow passage 13 can be suppressed. When the hydrogen gas is charged, moisture contained in the hydrogen gas may turn into water droplets and adhere to the inner surface of the second portion 34. Such water droplets generally move linearly along the extension direction of the second portion 34, and are therefore likely to accumulate in the fourth portion 36 extending in parallel from the second portion 34. In particular, the third portion 35 intersects the second portion 34 at substantially 90°, and therefore the water droplets are less likely to flow into the third portion 35 than in a case where the third portion 35 intersects the second portion 34 at an angle larger than 90° (obtuse angle). Thus, it is possible to suppress the adhesion of the water droplets to the check valve 17.

(2) The flow passage sectional area of the charging portion 31 is larger than the flow passage sectional area of the feeding portion 32. Therefore, it is possible to easily increase the flow rate when charging the hydrogen gas into the gas tank 2. Thus, it is possible to quickly charge the hydrogen gas into the gas tank 2.

(3) The second flow passage 13, the integrated attachment hole 23, and the composite valve attachment hole 24 are disposed in the same plane. Thus, the body 11 can be made more compact in the direction orthogonal to the plane.

(4) The valve subassemblies further include the composite valve 15 including the check valve portion configured to restrict the flow of the hydrogen gas from the fourth portion 36 to the feeding portion 32 and allow the flow of the hydrogen gas from the feeding portion 32 to the fourth portion 36. The check valve portion is disposed between the electromagnetic valve portion of the composite valve 15 and the fourth portion 36.

When water droplets adhere to the electromagnetic valve portion and are frozen, a great electromagnetic attraction force needs to be generated to operate the electromagnetic valve portion, thereby increasing the power consumption. In this regard, in the above configuration, water droplets that flow into the fourth portion 36 are blocked by the check valve portion. Thus, the adhesion of water droplets to the electromagnetic valve portion can be suppressed. When water droplets adhere to the check valve portion and are frozen, the check valve portion is stuck in the closed state. When feeding the hydrogen gas to the consumption device 5, however, the check valve portion is switched to the open state by the action of the high gas pressure of the gas tank 2. That is, the valve assembly 1 can be operated appropriately without increasing the power consumption.

(5) The charging portion 31 is open in the inner circumferential surface of the check valve attachment hole 92 of the integrated attachment hole 23, and the third portion 35 is open in the bottom surface of the check valve attachment hole 92. The check valve 17 includes the check valve housing 101 that defines the space S between the check valve housing 101 and the inner circumferential surface of the check valve attachment hole 92 and is fixed in the check valve attachment hole 92, and the check valve body 102 slidably housed in the check valve housing 101. The check valve housing 101 has the housing hole 113 that houses the check valve body 102 and communicates with the third portion 35, and the lateral hole 115 that communicates the housing hole 113 with the space S. In the above configuration, when charging the hydrogen gas, the hydrogen gas that flows from the third portion 35 into the housing hole 113 flows into the charging portion 31 via the lateral hole 115 and the space S. Therefore, moisture contained in the hydrogen gas is less likely to adhere to the check valve body 102, for example, than in the case where the check valve body 102 slides inside the check valve attachment hole 92.

(6) The valve subassemblies further include the safety valve 16 having the inlet 165 and configured to release the hydrogen gas flowing into the inlet 165 to the outside when the temperature of the safety valve 16 exceeds the threshold temperature. The safety valve 16 is attached to the integrated attachment hole 23 together with the check valve 17. The inlet 165 is configured to communicate with the charging portion 31 regardless of the open or closed state of the check valve 17. With the above configuration, the structure of the body 11 can be simplified compared to the case where a dedicated attachment hole for attaching the safety valve 16 is provided in the body 11. In the present embodiment, the flow passage sectional area of the charging portion 31 is large. Therefore, the hydrogen gas can be quickly released from the safety valve 16 in the event of an abnormality.

The present embodiment can be modified as follows. The present embodiment and the following modifications can be implemented in combination with each other in a technically consistent range.

The check valve housing 101 is fixed in the check valve attachment hole 92 by screw fastening. However, the present disclosure is not limited to this. The check valve housing 101 may be fixed in the check valve attachment hole 92 by any fixing method such as press fitting.

The check valve 17 need not include the check valve housing 101, and the check valve body 102 may be slidably housed in the check valve attachment hole 92.

The second flow passage 13, the integrated attachment hole 23, and the composite valve attachment hole 24 need not be disposed in the same plane.

The safety valve 16 need not be disposed coaxially with the check valve 17. In this case, the check valve attachment hole 92 need not be provided coaxially with the safety valve attachment hole 91.

The safety valve 16 need not be attached to the integrated attachment hole 23, and a dedicated attachment hole for attaching the safety valve 16 may be provided in the body 11. The valve assembly 1 need not include the safety valve 16.

The flow passage sectional area of the charging portion 31 may be the same as the flow passage sectional area of the feeding portion 32, or may be smaller than the flow passage sectional area of the feeding portion 32.

The check valve portion of the composite valve 15 need not be disposed coaxially with the electromagnetic valve portion.

The valve assembly 1 may include an electromagnetic valve and a check valve independent of the electromagnetic valve instead of the composite valve 15. The composite valve 15 may include only the electromagnetic valve portion and need not include the check valve portion.

The angle α of the third portion 35 from the second portion 34 may be equal to or smaller than 90°, typified by 30°, 45°, or 60°.

The fourth portion 36 need not be provided coaxially with the second portion 34 as long as it extends parallel to the second portion 34 from the tip portion of the second portion 34. That is, the axis of the fourth portion 36 need not coincide with the axis of the second portion 34.

The excess flow check valve 18 may be incorporated into the body 11 instead of being incorporated into the joint 19. The valve assembly 1 need not include the excess flow check valve 18.

The valve assembly 1 controls the flow of the high-pressure hydrogen gas. However, the present disclosure is not limited to this. The valve assembly 1 may control the flow of a gas other than the hydrogen gas.

Next, technical ideas that can be grasped from the above embodiment and modifications will be additionally described below.

(Appendix 1) The valve subassemblies may further include a safety valve having an inlet and configured to release a gas flowing into the inlet to an outside when a temperature of the safety valve exceeds a threshold temperature. The safety valve may be attached to the first attachment hole together with the check valve. The inlet may be configured to communicate with the charging portion regardless of an open or closed state of the check valve.

The invention claimed is:

1. A valve assembly comprising:
a body having a gas flow passage including a first flow passage and a second flow passage, a first attachment hole connected to the first flow passage and the second flow passage, and a second attachment hole connected to the first flow passage and the second flow passage; and
a plurality of valve subassemblies, wherein
the first flow passage is configured to be connected to a gas tank that stores a gas,
the second flow passage is configured to be selectively connected to any one of a plurality of external devices,
the plurality of external devices includes a supply source of the gas to be charged into the gas tank, and a consumption device configured to consume the gas fed out of the gas tank,
the plurality of the valve subassemblies include:
a check valve attached to the first attachment hole; and
an electromagnetic valve attached to the second attachment hole,
the first flow passage includes:
a charging portion connecting the first attachment hole to the gas tank; and
a feeding portion connecting the second attachment hole to the gas tank,
the second flow passage includes:
a common port that is an inlet for the gas supplied from the supply source and an outlet for the gas to be fed to the consumption device;
a linear first portion extending from the common port;
a linear second portion extending from the linear first portion;
a linear third portion connecting the first attachment hole to the linear second portion; and
a linear fourth portion connecting the second attachment hole to the linear second portion, the check valve is configured to restrict a flow of the gas from the charging portion to the linear third portion and allow a flow of the gas from the linear third portion to the charging portion,
the electromagnetic valve is configured to control a flow of the gas from the feeding portion to the linear fourth portion,
the linear third portion intersects the linear second portion at an angle equal to or smaller than 90° with respect to a first connection point of the linear second portion to the linear first portion, and
the linear fourth portion extends parallel to the linear second portion from an end opposite to the first connection point with respect to a second connection point of the linear second portion to the linear third portion.

2. The valve assembly according to claim 1, wherein a flow passage sectional area of the charging portion is larger than a flow passage sectional area of the feeding portion.

3. The valve assembly according to claim 1, wherein the second flow passage, the first attachment hole, and the second attachment hole are disposed in the same plane.

4. The valve assembly according to claim 1, wherein
the check valve is a first check valve,
the plurality of the valve subassemblies further include a second check valve configured to restrict a flow of the gas from the linear fourth portion to the feeding portion and allow the flow of the gas from the feeding portion to the linear fourth portion, and
the second check valve is disposed between the electromagnetic valve and the linear fourth portion.

5. The valve assembly according to claim 1, wherein
the charging portion is open in an inner circumferential surface of the first attachment hole,
the linear third portion is open in a bottom surface of the first attachment hole,
the check valve includes:
a housing configured to define a space between the housing and the inner circumferential surface of the first attachment hole, and fixed in the first attachment hole; and
a valve body slidably housed in the housing, and
the housing includes:
a housing hole that houses the valve body and communicates with the linear third portion; and
a lateral hole that communicates the housing hole with the space.

* * * * *